United States Patent
Kennedy et al.

(10) Patent No.: US 7,327,558 B2
(45) Date of Patent: Feb. 5, 2008

(54) FRONT-ACCESSIBLE COMMUNICATIONS PORT FOR ENCLOSED ELECTRICAL EQUIPMENT

(75) Inventors: Robert A. Kennedy, Murfreesboro, TN (US); Gary B. Pollard, Wendell, NC (US); James F. Clark, Murfreesboro, TN (US)

(73) Assignee: Square D Company, Palatine, IL (US)

(*) Notice: Subject to any disclaimer, the term of this patent is extended or adjusted under 35 U.S.C. 154(b) by 0 days.

(21) Appl. No.: 10/679,041

(22) Filed: Oct. 3, 2003

(65) Prior Publication Data

US 2004/0120109 A1   Jun. 24, 2004

Related U.S. Application Data

(60) Provisional application No. 60/416,612, filed on Oct. 7, 2002.

(51) Int. Cl.
*H02B 1/00*   (2006.01)
(52) U.S. Cl. .................. 361/668; 361/659; 361/661; 361/664
(58) Field of Classification Search ............... 361/600, 361/601, 622, 627–628, 634, 641, 658, 659, 361/661, 664, 679, 668
See application file for complete search history.

(56) References Cited

U.S. PATENT DOCUMENTS

| | | | |
|---|---|---|---|
| 5,233,511 A * | 8/1993 | Bilas et al. .................. 700/17 |
| 5,247,454 A | 9/1993 | Farrington et al. | |
| 6,378,111 B1 | 4/2002 | Brenner et al. | |
| 6,813,525 B2 | 11/2004 | Reid et al. | |
| 2002/0010518 A1 | 1/2002 | Reid et al. | |
| 2002/0190868 A1* | 12/2002 | Dearborn et al. | |
| 2003/0084112 A1 | 5/2003 | Curray et al. | |

FOREIGN PATENT DOCUMENTS

| | | |
|---|---|---|
| EP | 0966147 | 12/1999 |
| EP | 0966147 A2 * | 12/1999 |
| EP | 1073285 | 1/2001 |

OTHER PUBLICATIONS

PowerLogic Circuit Monitor—Series 2000, Square D/Schneider Electric Product Literature, 6 pages, dated 1999.
PowerLogic Series 4000 Circuit Monitor with Transient Detection, Square D/Schneider Electric Product Literature, 2 pages, dated Jun. 2001.
Powerlink G3 Lighting Control Systems, Schneider Electric, LaVergne, TN, Jun. 2002.
Powerlink AS Lighting Control System, Square D, LaVergne, TN, Oct. 1998.
Brochure entitled "Web-Enabled Power Management Solutions," XP002365407, Square D Schneider Electric, Jan. 2002.

* cited by examiner

*Primary Examiner*—Lisa Lea-Edmonds
*Assistant Examiner*—Anthony M Haughton

(57) ABSTRACT

An improved electrical equipment enclosure includes an electrical enclosure, electrical equipment in said electrical enclosure, said electrical equipment including one or more devices requiring a network connection to devices outside of said enclosure, and a network port mounted to said enclosure and accessible from externally of said enclosure and operatively coupled with said equipment requiring a network connection inside of said enclosure, for connecting said equipment with equipment outside of said enclosure.

19 Claims, 1 Drawing Sheet

FRONT-ACCESSIBLE COMMUNICATIONS PORT FOR ENCLOSED ELECTRICAL EQUIPMENT

CROSS-REFERENCE TO RELATED APPLICATION

This invention claims the priority of U.S. Provisional Patent Application Ser. No. 60/416,612, filed Oct. 7, 2002, for "Front-Accessible Ethernet Port for Enclosed Electrical Equipment."

FIELD OF THE INVENTION

This invention is directed generally to network communication access for enclosed electrical equipment, and more particularly to network access for power monitoring/metering and/or control equipment which is housed in an electrical enclosure with live electrical equipment.

BACKGROUND OF THE INVENTION

Network communications technology is beginning to be used in enclosed electrical equipment, such as electrical distribution panels, motor control centers and enclosed breakers.

Ethernet-based devices are typically mounted inside the enclosure, with a permanent network cable connection to the customer's Local Area Network (LAN). However, such electronic devices are normally designed by engineers most familiar with information technology and not harsh electrical equipment environments. Therefore, often the end-user must open the door to the equipment, or remove a sheet-metal panel, just to access the Ethernet-based device for commissioning or local data transfer.

Furthermore, a special "cross-over" Ethernet cable is required between the user's PC and the Ethernet device. The normal network connection must be disconnected to provide the opportunity to make the local (temporary) connection. Then, after the commissioning procedure or data transfer is complete, the permanent network cable must be reconnected, and the equipment door or panel replaced. Equipment manufacturers recommend equipment be de-energized for servicing; this further complicates the process, since the Ethernet-based device must be powered on during commissioning or data transfer. To accomplish this safely, the equipment must be de-energized and re-energized only while covers are safely removed and only for that period of time during which the Ethernet-based device must be powered on.

PowerLogic® gateways (e.g., model EGX or ECC made by Square D Company, the assignee of this invention, as well as some competitive products) provide an Ethernet port for access to web pages representing the equipment. However, these products are typically mounted inside the enclosure, making it necessary to open the equipment door or remove a sheet-metal panel to gain access to the device. Furthermore, a special "cross-over" cable is still required, and this connection requires disconnecting the permanent network connection temporarily while commissioning takes place.

Power equipment with an embedded Ethernet server may not be so easy to commission. Typical power control and monitoring equipment, such as Square D's EGX and Power Server™ (PS) require local Ethernet connection to set the IP address. This requires the customer to de-energize equipment (unless server is in a separate compartment), open equipment door or access-panel, reach in and disconnect Ethernet cable to LAN, re-connect a special "cross-over" cable to EGX or PS, re-energize equipment, set IP address, de-energize equipment again, if needed, remove temporary crossover cable, reconnect permanent Ethernet cable to LAN, close equipment, and re-energize. A better solution is needed to ensure "easy to commission" Ethernet access for the equipment.

The ECC server is mounted in a CM3000 or CM4000 power monitor (also made by the Square D Company), which can be furnished with a local panel-mounted display. Using this display, the initial commissioning of the server can be accomplished, thus avoiding the safety concerns described above. However, this solution is only cost-effective if comprehensive metering (the main purpose of this device) is required. Furthermore, this only alleviates the problem with commissioning; this does not provide a solution for local access to data transfer (without interrupting remote operations, opening the enclosure, etc.).

OBJECTS OF THE INVENTION

Accordingly, it is a general object of the invention to provide communication access for power monitoring/metering and/or control equipment housed in an electrical enclosure with live electrical equipment

SUMMARY OF THE INVENTION

Briefly, in accordance with the foregoing, an electrical equipment enclosure includes an electrical enclosure, electrical equipment in said electrical enclosure, said electrical equipment including one or more devices or electrical systems requiring a communication connection to devices outside of said enclosure, and a communication port mounted to said enclosure and accessible from externally of said enclosure and operatively coupled with said equipment requiring a communication connection inside of said enclosure, for connecting said equipment with equipment outside of said enclosure.

BRIEF DESCRIPTION OF THE DRAWINGS

The FIGURE is a simplified diagram showing an Ethernet-based device housed in an electrical enclosure.

DETAILED DESCRIPTION OF THE ILLUSTRATED EMBODIMENT

Figure 1:
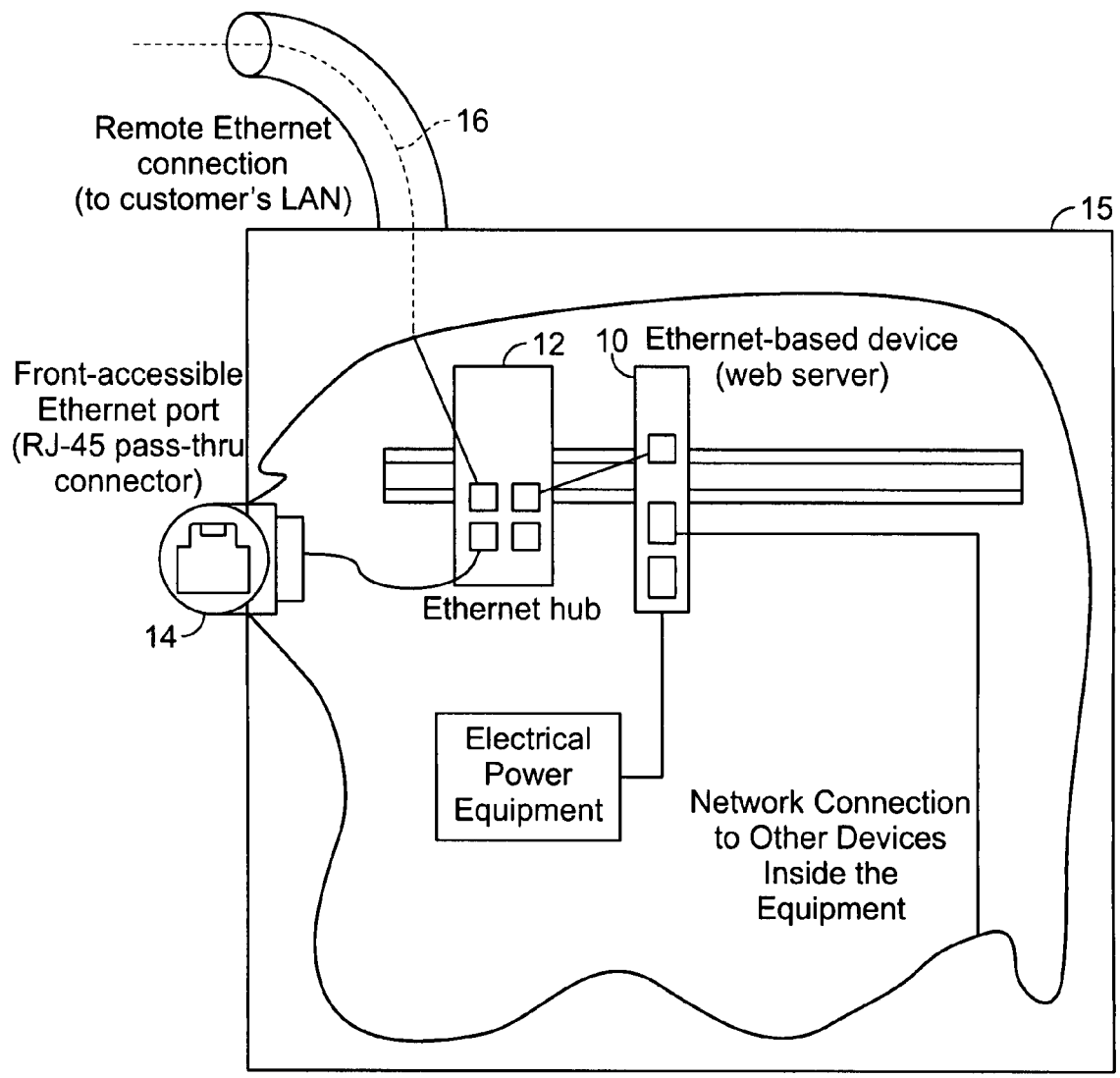

Power equipment equipped with the technology described herein below avoids all the above-mentioned problems.

A front-accessible Ethernet port allows access for commissioning and subsequent data transfer without opening equipment doors or removing access panels—improving safety and saving time. This port accepts a standard Ethernet cable, since the "crossover" function is accomplished inside the equipment. No special "crossover" cable is required.

Because the equipment can be left energized safely, no time-consuming procedure is needed to de-energize and re-energize the equipment, saving additional time.

Finally, because the permanent network connection remains intact, the front-accessible port allows local data transfer without interfering with remote operations.

Referring to FIG. 1, an Ethernet-based device 10 (shown here as an Ethernet gateway/web server for other connected devices inside an electrical enclosure 15) is connected to one port of a 4-port industrially-rated Ethernet hub 12, according to one embodiment of the present invention. The hub allows simultaneous connection of a remote Ethernet cable 16 (to customer's LAN) and a front-accessible Ethernet port 14 (for local access for commissioning and data transfer). The front port is an RJ-45 "pass-thru" connector, with standard (RJ-45) Ethernet jacks mounted back-to-back. These connectors, as well as the 4-port hub, are commercially available components, applied in this way uniquely to provide the desired benefits of safety, performance and convenience.

According to another embodiment of the present invention, the Ethernet hub function is incorporated within the Ethernet-based (web server) device 10.

This arrangement allows commissioning of "web-enabled" electrical equipment and access to operating data via an Ethernet network without requiring the equipment to be opened or special cables to be used. The local front port also allows local data transfer to take place without interfering with remote operations.

The invention provides a solution which features a front-accessible Ethernet port 14. A pass-through connector allows easy access to set the IP address. There is no need to open energized equipment to commission the EGX or Power Server or for local access to data transfer. No special "crossover" cable is needed. A connector specially designed for industrial environments may include a tethered cap. To allow multiple Ethernet connections, the hub 12 may be provided inside the equipment.

The front-accessible Ethernet port 14 greatly facilitates commissioning and normal operation. The following outlines a setup procedure:

Verify equipment is connected to active hub on customer LAN.

Get IP address from LAN administrator.

Enter this IP address into equipment (via front-accessible port 14).

Now you're ready to type this IP address into your browser and read your meters.

The front port 14 can also be used to connect to the LAN anytime after commissioning to access data.

According to one illustrative embodiment of the present invention, the communications technology is Ethernet-based and a front-accessible Ethernet port is used for descriptive purposes herein. According to another embodiment of the present invention, the front-accessible communication port for enclosed electrical equipment is an infrared port. According to yet another embodiment of the present invention, the front-accessible communication port for enclosed electrical equipment is a low power wireless technology such as 802.11(a, b or g) or Bluetooth.

While particular embodiments and applications of the present invention have been illustrated and described, it is to be understood that the invention is not limited to the precise construction and compositions disclosed herein and that various modifications, changes, and variations may be apparent from the foregoing descriptions without departing from the spirit and scope of the invention as defined in the appended claims.

What is claimed is:

1. An electrical equipment enclosure comprising:
an electrical enclosure having an accessible front exterior surface;
electrical power monitoring or metering equipment mounted in said electrical enclosure; and
a pair of Ethernet communication ports mounted to said enclosure and operatively coupled with said electrical power monitoring or metering equipment for connecting said electrical power monitoring or metering equipment with equipment outside of said enclosure, one of said ports being inaccessible from outside said enclosure when said enclosure is installed, the other of said ports being accessible from outside said enclosure when said enclosure is installed to enable coupling of said power monitoring or metering equipment inside said enclosure to an Ethernet outside said enclosure.

2. The electrical equipment enclosure of claim 1 wherein said enclosure is a power distribution enclosure.

3. The electrical equipment enclosure of claim 1 wherein said enclosure is a control center.

4. The electrical equipment enclosure of claim 1 wherein said enclosure is a circuit breaker panel enclosure.

5. The electrical equipment enclosure of claim 1 wherein said enclosure is an electrical switchgear cabinet.

6. The electrical equipment enclosure of claim 1 wherein said enclosure is an electrical unit substation.

7. The electrical equipment enclosure of claim 1 wherein said enclosure is an electrical distribution switchboard.

8. The electrical equipment enclosure of claim 1 and further including an Ethernet hub providing a plurality of Ethernet connection ports mounted inside of said enclosure and operatively connected with said Ethernet communication ports and with said power monitoring or metering equipment.

9. The electrical equipment enclosure of claim 1 wherein said enclosure has an accessible front surface, and wherein said accessible port is mounted to said front surface.

10. The electrical equipment enclosure of claim 1 wherein said accessible port is accessible wirelessly.

11. The electrical equipment enclosure of claim 9 wherein said accessible port is accessible via infrared radiation.

12. A method of providing a local communications connection for electrical power monitoring or metering equipment mounted inside of an electrical enclosure comprising:
coupling said electrical power monitoring or metering equipment inside said enclosure to at least one external Ethernet outside of said enclosure through a pair of Ethernet communications ports mounted to said enclosure and operatively coupled with said electrical power monitoring or metering equipment, one of said ports being inaccessible from outside said enclosure when said enclosure is installed, the other of said ports being accessible from outside said enclosure when said enclosure is installed to enable coupling of said power monitoring or metering equipment inside said enclosure to an Ethernet outside said enclosure.

13. The method of claim 12 which includes communicating with said power monitoring equipment through said communications port via Ethernet.

14. The method of claim 12 which includes communicating with said power monitoring or metering equipment through said accessible port wirelessly.

15. The method of claim 14 which includes communicating with said power monitoring or metering equipment via infrared radiation.

16. The electrical equipment enclosure of claim 1 wherein said electrical power monitoring or metering equipment is power monitoring equipment.

17. The electrical equipment enclosure of claim 1 wherein said electrical power monitoring or metering equipment is networked power monitoring equipment.

18. The method of claim 12 wherein said electrical power monitoring or metering equipment is power monitoring equipment.

19. The method of claim 12 wherein said electrical power monitoring or metering equipment is networked equipment.

* * * * *